United States Patent Office 2,756,837
Patented July 31, 1956

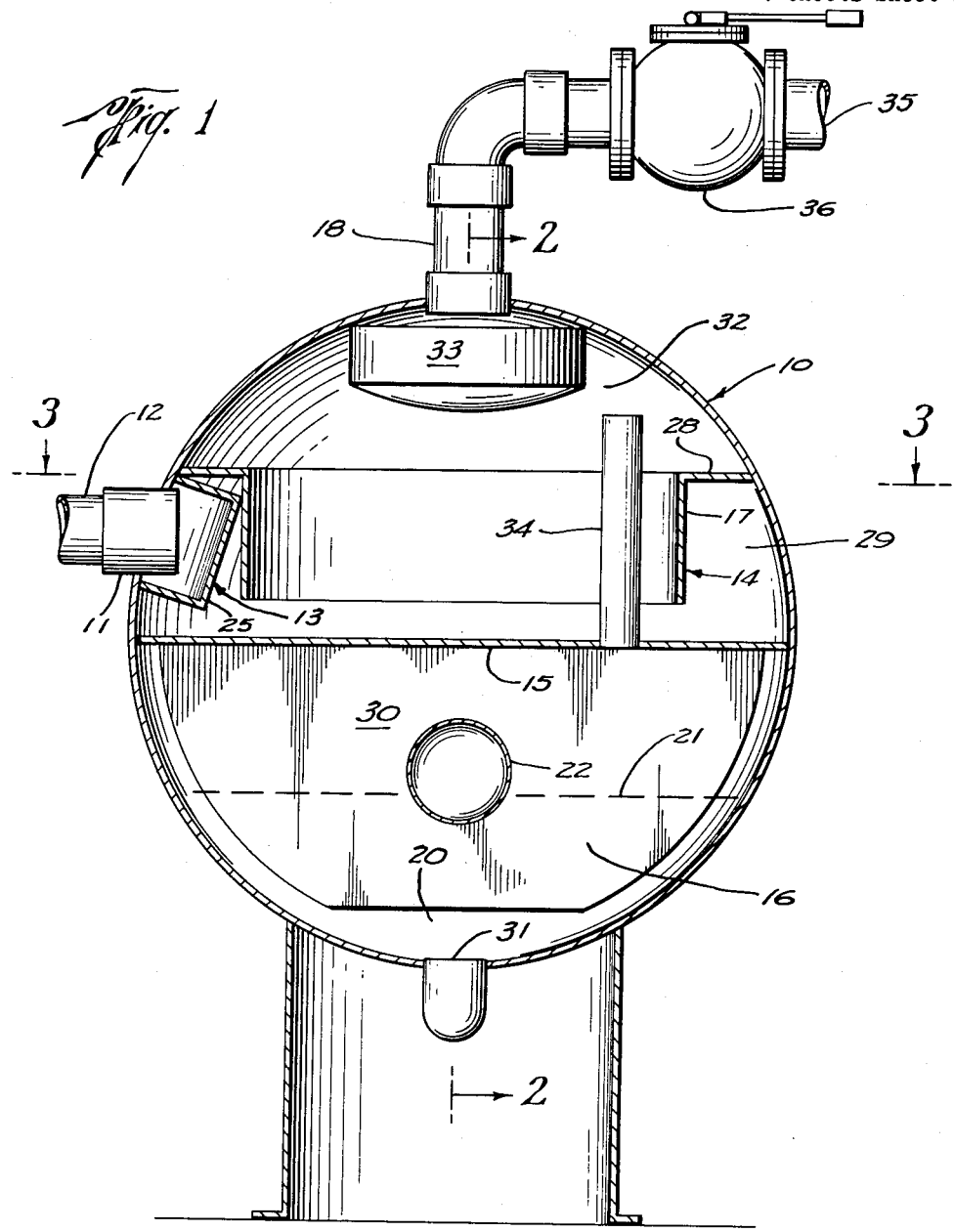

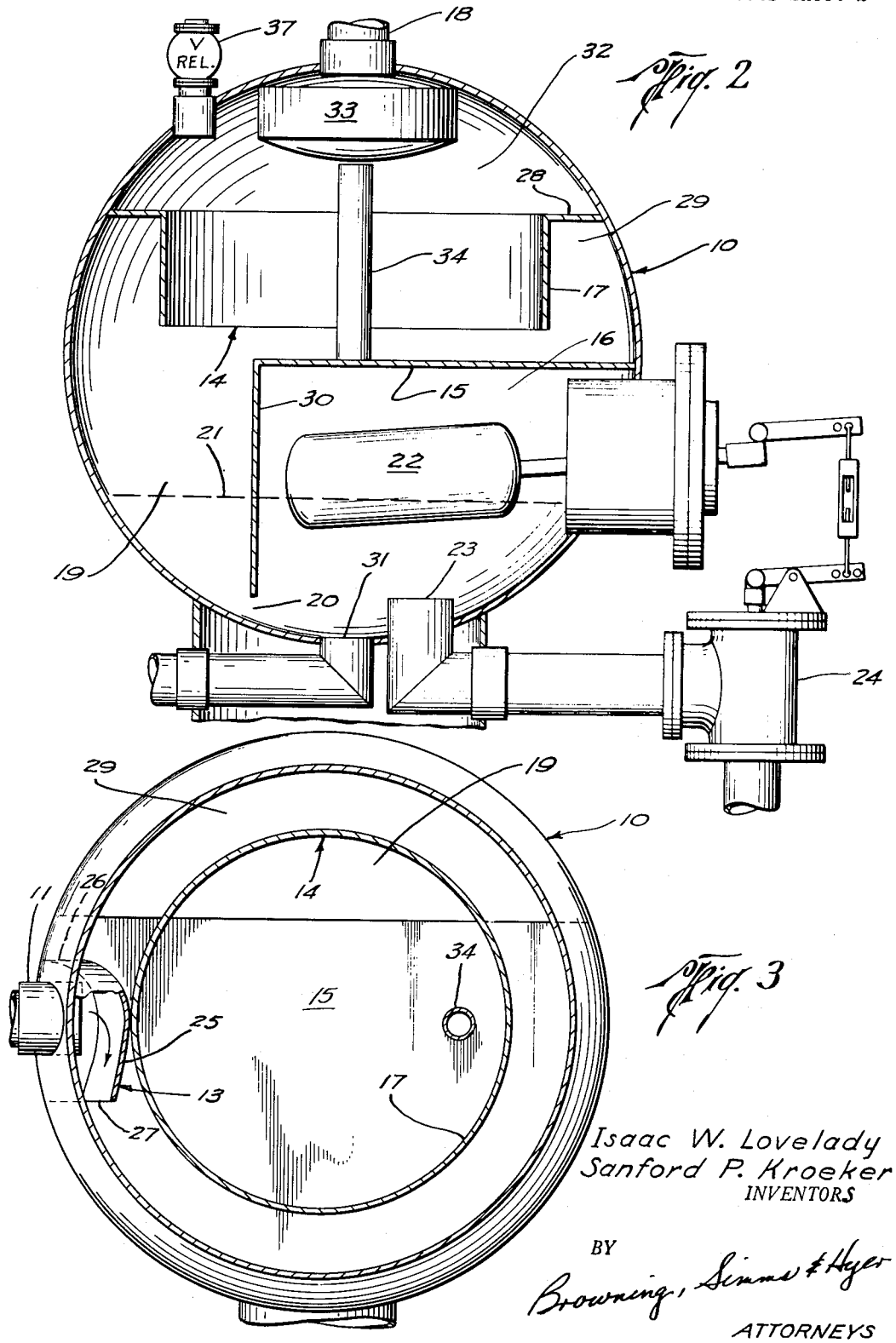

2,756,837

LIQUID AND GAS SEPARATOR

Isaac W. Lovelady and Sanford P. Kroeker, Odessa, Tex., assignor to Sivalls Tanks, Inc., Odessa, Tex., a corporation of Delaware Application June 28, 1954, Serial No. 439,692

4 Claims. (Cl. 183—2.7)

This invention relates to a liquid and gas separator which employs centrifugal force as a separating agency. In one of its aspects, it relates to a centrifugal separator including a spherical shell or vessel in which a stream of well fluid containing oil and gas is directed circumferentially about its inner periphery in a manner to obtain optimum separation of the oil and gas.

It is the practice in the industry to direct a stream of well fluids containing gas entrained in oil tangentially against the inner periphery of a curved wall vessel to cause the stream to swirl circumferentially around the vessel wall and thereby separate the oil and gas by centrifugal action. The heavier oil is thrown outwardly and is plastered against the vessel wall, over which it spreads downwardly upon spending of its initial velocity and is accumulated in the bottom of the vessel. The lighter gas collects towards the center of the swirling fluid and rises to the upper portion of the vessel. Additional separation of gas and oil may be effected during settling and accumulation of the latter in a relatively quiescent state and the separated phases are then removed from the vessel to a suitable place of disposal.

While the separator of this invention is described particularly in connection with the separation of oil and gas, as commonly found in well fluids, its utility is not restricted thereto but may be applied to other liquid-gas mixtures.

An object of this invention is to provide a centrifugal separator in which oil and gas separation, gas collection, and oil accumulation are all effected in a single spherical vessel, whereby a minimum of space is required and maximum structural strentgh and ease of fabrication of parts is obtained.

Another object is to provide a centrifugal separator in which a stream of oil and gas is caused to be spread over a greater area of vessel wall than has heretofore been possible.

Yet another object is to provide a centrifugal separator vessel having an inlet thereto for a stream of well fluid and novel means within the vessel for guiding said stream circumferentially around the inner periphery of the vessel to promote more efficient separation of the gas and oil.

A further object is to provide a spherical separator vessel having an oil accumulating chamber arranged therein to cooperate with a swirling stream of well fluid in a novel manner to provide a maximum of oil-gas interface area for effecting separation of the oil and gas.

A still further object is to provide a centrifugal separator vessel having a novel diverter therein for directing an incoming stream of well fluid against the inner periphery of the vessel along a truly circumferential path.

A still further object is to provide a vessel of the type described in the foregoing object having guide means adapted to cooperate with the circumferentially directed stream of well fluid to direct the oil of the fluid down along the inner periphery of the vessel and the gas upwardly through the center of the guide means.

In the drawings, wherein like reference characters are used throughout to designate like parts:

Fig. 1 is a vertical sectional view of the separator of the present invention;

Fig. 2 is a vertical sectional view taken at 90° to the section of Fig. 1, substantially along broken line 2—2 of Fig. 1; and Fig. 3 is a horizontal sectional view taken substantially along broken line 3—3 of Fig. 1.

Referring to the drawings, it can be seen that the separator of this invention comprises a spherical vessel 10 and an inlet 11 for introducing a stream of well fluid from a conduit 12 into the interior of the vessel. The spherical construction of the vessel enables the use of a minimum amount of metal for any given internal working pressure. As well, the spherical shape enables a more economical fabrication and installation of the internal parts of the vessel, including the partitions to be described, inasmuch as the fitting of these parts to the vessel wall is along a circular path.

The inlet to the vessel connects with a diverter 13 which directs the stream against the inner periphery of the vessel along a truly circumferential path. A guide means 14 within the vessel is arranged with respect to the diverter to prevent initial upward movement of the stream and thus cause it to spread over the vessel periphery. Upon spending its initial velocity, the oil separated by the centrifugal action of the stream spreads down along the vessel wall onto a substantially horizontal plate 15 which forms the upper wall of an accumulation chamber 16 at the lower portion of the vessel. The location of the guide means and plate are thus arranged to promote maximum oil-gas interface area for the oil.

The gas of the stream hugs a cylindrical element 17 of the guide means, which element is hollow and permits the gas to escape under its lower edge and upwardly to an outlet 18 in the upper portion of the chamber. The combination of the initial centrifugal motion imparted by the direction given the incoming well fluids and the difference in densities between the gas and the oil cause the gas to form a whirling vortex in the center of the separator and the heavier oil to be pushed or plastered against the furtherest extremity of the spherical separator shell. Gas which separates from and rises above the settling oil in chamber 19 and the accumulation chamber 16 beneath the guide means 14 will escape in a similar manner.

The settling oil passes to the accumulation chamber through a passage 20 beneath a maintained oil level 21 in the vessel such that foam on the settling oil will be prevented from entering the accumulation chamber and interfering with the functions of floats 22 or other suitable level controls therein. The outlet 23 from the accumulation chamber is arranged in a manner to prevent fouling of a control valve 24 therefor by foreign matter in the oil.

Turning now more specifically to the novel diverter 13 and guide means 14, the fluid to be separated may be passed into the diverter through the inlet in a path substantially radially of the vessel. The diverter comprises a substantially U-shaped member 25, the open side of which is secured to the inner periphery of the vessel to form a conduit along the vessel periphery. More particularly, one end 26 of the conduit 25 is closed and the other end 27 is open, the closed end being adjacent the inlet 11 and the open end providing an outlet for introducing the fluid into the vessel along a path circumferentially of the vessel periphery. As best shown in Fig. 3, the closed end 26 of the conduit is flared to receive and initially divert the incoming stream through conduit 11, while the open end 27 is confined, for a purpose to be described.

Preferably, the confined open end 27 of the conduit has a cross-sectional area less than that of inlet 11 such that the stream of fluid is introduced into the vessel at an increased velocity. It will be seen from the foregoing that the stream of well fluid is thus introduced into the vessel along a truly circumferential path. Also, it can be seen that the spherical vessel periphery over which the stream may be plastered prior to spending its velocity and dropping downwardly in the vessel provides considerably more surface than that provided in conventional cylindrical vessels.

As shown in this particular embodiment of the invention, the diverter 13 and guide means 14 are disposed in the upper half of the vessel such that all of the assembly work may be done in each half of the vessel before they are put together. Also, in the case of small vessels, the location of the diverter and guide means vertically therein may be dictated by space requirements in the oil accumulation chamber for proper functioning of the float 22.

The afore-mentioned cylinder 17 of the guide means 14 is arranged in spaced relation to the vessel and the guide means includes an imperforate annular flange or ring 28 which extends across the space 29 between the upper edge of the cylinder and the inner periphery of the vessel. The diameter of the cylindrical guide 17 is such that it is positioned closely adjacent the shell of the vessel to provide a centrifugal separator chamber. The diameter of the guide 17 should be at least as great as the radius of the vessel. Due to the small radial dimension of the chamber, the incoming mixture will be forced to remain closely adjacent the shell of the sphere and centrifugal separation under low velocity conditions will be assured. The outer periphery of the cylinder below the ring is of substantially uniform diameter, such that the gas is enabled to turn substantially 180° in flowing under the lower edge thereof. As can be seen from the drawings, the ring 28 is located above the diverter outlet 27 and the lower edge of the cylinder 17 extends below a substantial portion of said outlet and terminates immediately above plate 15. Thus, as previously described, the stream of incoming fluid introduced through the diverter is caused to swirl circumferentially around the circumference of the vessel before gas thus separated by centrifugal action is permitted to escape upwardly through the hollow cylinder 17. In operation, it is found that the separated oil will hug the inner periphery of the sphere, while the lighter gas will hug the outer periphery of the cylinder 17. In this manner, the separated gas must travel downwardly over the outer periphery of the cylinder 17 before it can escape upwardly therethrough and out the outlet 18.

The substantially horizontal plate 15 fits along the vessel periphery and extends across a substantial portion of the cross section of the vessel 10 but short of the entire distance thereacross to permit the separated oil to spread downwardly from the guide means 14 and over the inner periphery of the vessel onto the plate 15, from which it runs off into the chamber 19, the entrance to which is provided by the free edge of the plate. Preferably plate 15 covers the area on one side of a vertical diametral plane through the sphere. There is thus provided a very large oil-gas interface to promote additional separation of gas from the oil spreading over the plate 15. Inasmuch as this plate 15 extends a substantial distance across the vessel, it will be appreciated that a very large proportion of the oil spreading over the inner periphery of the vessel will also spread over the plate 15 prior to settling in the chamber 19.

According to a still further novel aspect of this invention, the plate 15 forms the upper wall of the accumulation chamber 16, thus serving as another space saving factor and enabling still further compactness of the separator. The remaining wall structure of the chamber 16 comprises a depending wall 30 which extends substantially vertically downwardly from the free edge of plate 15 to a lower level where it is cut off to provide the passage 20 connecting the chamber 19 with the chamber 16. As previously described, suitable level control in the accumulation chamber is operative to maintain oil level 21 above the passage 20 such that oil from the chamber 19 is permitted to pass into the accumulation chamber from which it may be disposed outwardly of the vessel, but at the same time agitation in the chamber 16 is reduced and any foam on the top of the oil in the chamber 19 is prevented from passing into the chamber 16 where it would cause the float 22 to perform improperly in maintaining this level. At the same time, the liquid level is maintained below the plate 15 which forms the upper wall of the chamber 16 such that the aforementioned spreading and runoff of the oil is permitted.

Referring in more particular to the accumulation chamber, it can be seen that in the particular embodiment shown that the outlet 23 is provided with a mechanically operated valve 24 which is responsive to a connection between the valve and the float 22 whereby the liquid level may be maintained as desired. It will be understood, of course, that equivalent level control means may be employed.

The upper edge or inlet to the oil outlet 23 is raised above the lowermost level of the sphere. It can also be seen that a drain 31 is provided in the lowermost portion of the sphere within the chamber 16. This drain 31 provides an outlet for water, sand, and other foreign matter in the oil which is heavier than the oil and will settle to the bottom of the accumulation chamber. It will be understood that, inasmuch as the level of this drain is below that of the oil outlet 23, periodic opening of the drain will prevent such foreign matter from spilling over into the oil outlet and fouling parts of the valve 24.

The guide means 14, including the cylinder 17 and ring 28, defines a gas collection chamber 32 in the uppermost portion of the vessel 10. Disposed directly beneath the outlet 18 and between the guide means 14 and said outlet is a mist extractor 33 which, as illustrated, may be a ceramic saddle-type extractor. Extending between the gas collection chamber 32 and the accumulation chamber 16 is a pipe 34 which provides pressure equalization between the gas collection chamber and the oil accumulating chamber as well as an outlet for gas which may separate from the oil in the oil accumulating chamber 16. As shown, the extractor 33 includes a cylindrical ring which is imperforate and is connected to the upper vessel wall such that all gas is caused to pass through the extractor prior to entering the outlet 18.

The conduit 25 for disposing of the gas from the outlet 18 is provided with a suitable back pressure valve 36 for maintaining the pressure of the gas within the vessel at a required level. Also, a relief valve 37 is provided in the upper portion of the gas collection chamber 32 to prevent the accumulation therein of excessive pressures.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An oil and gas separator comprising, a spherical vessel, a substantially upright hollow guide cylinder within the vessel having its upper end connected to the vessel and providing with the shell of the sphere a centrifugal separator chamber, said cylinder having a diameter at least as great as the radius of the sphere, inlet means for introducing an oil-gas mixture tangentially into said chamber, a horizontally extending plate within the vessel located at substantially the horizontal diameter thereof and below the guide cylinder for receiving the oil-gas mixture from the wall of the vessel to provide additional oil-gas interface area, the lower end of said cylinder terminating immediately above the plate to provide an outlet from said chamber permitting the separated gas to flow under the cylinder and up into the center of the cylinder and the oil-gas mixture to flow inwardly from the periphery of the vessel along the plate and under the wall of the cylinder so that gas separated from the oil-gas mixture on the plate after it leaves the chamber may pass unobstructed into the hollow cylinder, a gas outlet in the top of the sphere, an oil accumulator in the bottom of the sphere receiving oil from the plate, and an outlet from the oil accumulator chamber.

2. An oil and gas separator comprising, a spherical vessel, inlet means for introducing a stream of gas and oil tangentially onto the inner periphery of the vessel, a plate extending substantially horizontally across the vessel below the inlet and receiving oil from the inner periphery of the vessel to provide additional oil-gas interface area, a substantially upright hollow guide cylinder within the vessel having its upper end connected to the vessel and its lower end terminating closely adjacent the plate and having a diameter only slightly less than the diameter of the vessel to initially confine the incoming oil-gas mixture to an area bordering the shell of the sphere and to expose a large area of the plate to the interior of the cylindrical guide so that gas released from the oil and gas mixture on the plate within said area may rise unobstructed through the guide, the outer diameter of the lowermost edge of the guide means being no greater than the outer diameter of any portion of the guide means above said lowermost edge, a gas outlet through the top of the sphere, an oil accumulator in the bottom of the sphere receiving oil from the plate and an outlet from the oil accumulator chamber.

3. An oil and gas separator comprising, a spherical vessel, inlet means for introducing a stream of gas and oil tangentially onto the inner periphery of the vessel, a plate extending substantially horizontally across the vessel below the inlet and receiving oil from the inner periphery of the vessel to provide additional oil-gas interface area, a substantially upright hollow guide cylinder within the vessel having its upper end connected to the vessel and having a diameter at least as great as the radius of the vessel to initially confine the incoming oil-gas mixture to an area bordering the shell of the sphere and to expose a large area of the plate to the interior of the cylindrical guide so that gas released from the oil and gas mixture on the plate within said area may rise unobstructed through the guide, a gas outlet in the top of the sphere, an oil accumulator in the bottom of the sphere receiving oil from the plate and an outlet from the oil accumulator chamber.

4. An oil and gas separator comprising, a spherical vessel, inlet means for introducing a stream of oil and gas tangentially onto the inner periphery of the vessel, a plate extending substantially horizontally across the vessel below the inlet and receiving oil from the inner periphery of the vessel to provide additional oil-gas interface area, said plate covering at least the area on one side of a vertical diametral plane through the sphere and continuously connected to the inner periphery of the vessel on said one side of said diametral plane, said inlet discharging onto the wall of the sphere over the plate in a direction to direct the oil and gas mixture over the plate, an oil accumulator in the bottom of the sphere receiving oil from the plate, an outlet from the oil accumulator chamber, a substantially upright hollow guide cylinder within the vessel having its upper end connected to the vessel and its lower end terminating closely adjacent the horizontally extending plate and having a diameter only slightly less than the diameter of the vessel to initially confine the incoming oil-gas mixture to an area bordering the shell of the sphere and cause a substantial portion of the oil-gas mixture to be plastered on the inner periphery of the shell and to flow downwardly and contact the plate on said one side of said diametral plane whereby said oil will flow across a substantial portion of the plate before passing into the accumulator and during a substantial portion of said flow be exposed to the interior of the guide so that gas released from the oil and gas mixture on the plate may rise unobstructed through the guide, and a gas outlet in the top of the sphere.

References Cited in the file of this patent

UNITED STATES PATENTS

| | | |
|---|---|---|
| 1,860,896 | McGraw et al. | May 31, 1932 |
| 1,925,491 | Lorraine | Sept. 5, 1933 |
| 1,970,784 | Walker | Aug. 21, 1934 |
| 2,016,641 | Lincoln | Oct. 8, 1935 |
| 2,276,277 | Waters | Mar. 17, 1942 |
| 2,353,833 | Kimmell | July 18, 1944 |
| 2,511,351 | Laidley | June 13, 1950 |
| 2,678,699 | Fowler | May 18, 1954 |